(12) United States Patent
Williamson

(10) Patent No.: US 8,364,687 B2
(45) Date of Patent: Jan. 29, 2013

(54) SYSTEMS AND METHODS FOR BINDING MULTIPLE INTERPOLATED DATA OBJECTS

(75) Inventor: Eric Williamson, Willow Spring, NC (US)

(73) Assignee: Red Hat, Inc., Raleigh, NC (US)

( * ) Notice: Subject to any disclaimer, the term of this patent is extended or adjusted under 35 U.S.C. 154(b) by 101 days.

(21) Appl. No.: 12/955,811

(22) Filed: Nov. 29, 2010

(65) Prior Publication Data

US 2012/0136880 A1     May 31, 2012

(51) Int. Cl.
*G06F 17/00* (2006.01)

(52) U.S. Cl. ........................ 707/756; 707/748

(58) Field of Classification Search .................. 707/756
See application file for complete search history.

(56) References Cited

U.S. PATENT DOCUMENTS

| | | | |
|---|---|---|---|
| 5,890,167 A | 3/1999 | Bridge, Jr. et al. | |
| 5,978,796 A | 11/1999 | Malloy et al. | |
| 6,360,188 B1 | 3/2002 | Freidman et al. | |
| 6,366,922 B1 | 4/2002 | Althoff | |
| 6,434,435 B1 | 8/2002 | Tubel et al. | |
| 6,434,544 B1 | 8/2002 | Bakalash et al. | |
| 6,594,672 B1 | 7/2003 | Lampson et al. | |
| 6,609,123 B1 | 8/2003 | Cazemier et al. | |
| 6,735,590 B1 | 5/2004 | Shoup et al. | |
| 6,931,418 B1 | 8/2005 | Barnes | |
| 7,152,062 B1 | 12/2006 | Draper et al. | |
| 7,299,241 B2 | 11/2007 | Reed et al. | |
| 7,660,822 B1 | 2/2010 | Pfleger | |
| 2001/0049678 A1 | 12/2001 | Yaginuma | |
| 2002/0029207 A1 | 3/2002 | Bakalash et al. | |
| 2002/0035562 A1 | 3/2002 | Roller et al. | |
| 2002/0083034 A1 | 6/2002 | Orbanes et al. | |
| 2002/0087516 A1 | 7/2002 | Cras et al. | |
| 2002/0169658 A1 | 11/2002 | Adler | |
| 2003/0114950 A1 | 6/2003 | Ruth et al. | |
| 2003/0115194 A1 | 6/2003 | Pitts et al. | |
| 2003/0115207 A1 | 6/2003 | Bowman et al. | |
| 2003/0120372 A1 | 6/2003 | Ruth et al. | |
| 2003/0126114 A1 | 7/2003 | Tedesco | |
| 2003/0164847 A1* | 9/2003 | Zaima et al. | 345/723 |
| 2003/0184585 A1 | 10/2003 | Lin et al. | |

(Continued)

OTHER PUBLICATIONS

Using OLAP and Multi-Dimensional data for decision making, Hasan et al. IEEE 2001.

(Continued)

*Primary Examiner* — Belix M Ortiz Ditren
(74) *Attorney, Agent, or Firm* — Lowenstein Sandler PC

(57) ABSTRACT

Embodiments relate to systems and methods for binding multiple interpolated data objects. A database management system can store operational data, such as financial, medical, or other information. A user can access a set of target data, representing an output desired to be generated from an interpolated set of input data. Thus, the average air temperature of a region may be known for ten years, along with other inputs including water temperature, wind speed, and other data. The interpolation engine can receive a target temperature for the current year, and generate water temperatures, wind speeds, or other inputs that will produce the target temperature. The interpolation engine can also be configured to access and combine two or more sets of interpolated data using a set of data bindings into one multiply-bound interpolation object. The combined or multiply-bound interpolation object can be operated on by the interpolation engine or accessing application(s) on a unified and updateable basis.

20 Claims, 9 Drawing Sheets

U.S. PATENT DOCUMENTS

| | | |
|---|---|---|
| 2003/0225736 A1 | 12/2003 | Bakalash et al. |
| 2004/0039736 A1 | 2/2004 | Kilmer et al. |
| 2004/0133552 A1 | 7/2004 | Greenfield et al. |
| 2004/0139061 A1 | 7/2004 | Colossi et al. |
| 2005/0004904 A1 | 1/2005 | Kearney et al. |
| 2005/0010566 A1 | 1/2005 | Cushing et al. |
| 2005/0060382 A1 | 3/2005 | Spector et al. |
| 2006/0004833 A1 | 1/2006 | Trivedi et al. |
| 2006/0036707 A1 | 2/2006 | Singh et al. |
| 2006/0136462 A1 | 6/2006 | Campos et al. |
| 2006/0262145 A1 | 11/2006 | Zhang et al. |
| 2007/0022093 A1 | 1/2007 | Wyatt et al. |
| 2007/0027904 A1 | 2/2007 | Chow et al. |
| 2007/0088757 A1 | 4/2007 | Mullins et al. |
| 2007/0094236 A1 | 4/2007 | Otter et al. |
| 2007/0208721 A1 | 9/2007 | Zaman et al. |
| 2008/0140696 A1 | 6/2008 | Mathuria |
| 2008/0172405 A1 | 7/2008 | Feng et al. |
| 2008/0243778 A1 | 10/2008 | Behnen et al. |
| 2008/0294596 A1 | 11/2008 | Xiong |
| 2008/0320023 A1 | 12/2008 | Fong |
| 2009/0193039 A1 | 7/2009 | Bradley et al. |
| 2009/0222470 A1 | 9/2009 | Kemp et al. |
| 2009/0248490 A1* | 10/2009 | Moncreiff ............... 705/10 |
| 2010/0057700 A1 | 3/2010 | Williamson |
| 2010/0057777 A1 | 3/2010 | Williamson |
| 2010/0131456 A1 | 5/2010 | Williamson |
| 2010/0169299 A1 | 7/2010 | Pollara |
| 2010/0305922 A1 | 12/2010 | Williamson |
| 2010/0306254 A1 | 12/2010 | Williamson |
| 2010/0306255 A1 | 12/2010 | Williamson |
| 2010/0306272 A1 | 12/2010 | Williamson |
| 2010/0306281 A1 | 12/2010 | Williamson |
| 2010/0306340 A1 | 12/2010 | Williamson |
| 2010/0306682 A1 | 12/2010 | Williamson |
| 2011/0050728 A1 | 3/2011 | Williamson |
| 2011/0054854 A1 | 3/2011 | Williamson |
| 2011/0055680 A1 | 3/2011 | Williamson |
| 2011/0055761 A1 | 3/2011 | Williamson |
| 2011/0055850 A1 | 3/2011 | Williamson |
| 2011/0078199 A1 | 3/2011 | Williamson |
| 2011/0078200 A1 | 3/2011 | Williamson |
| 2011/0131176 A1 | 6/2011 | Williamson |
| 2011/0131220 A1 | 6/2011 | Williamson |
| 2011/0158106 A1 | 6/2011 | Williamson |
| 2011/0161282 A1 | 6/2011 | Williamson |
| 2011/0161374 A1 | 6/2011 | Williamson |
| 2011/0161378 A1 | 6/2011 | Williamson |

OTHER PUBLICATIONS

A new OLAP aggregation based on the AHC technique, Massaoud et al, DOLAP'04 Nov. 12-13, 2004.

Interactive hierarchical dimension ordering, spacing and filtering for exploration of high dimension datasets, Yang et al, IEEE symposium on information visualization 2003.

Williamson, "Systems and Methods for Interpolating Conformal Input Sets Based on a Target Output", U.S. Appl. No. 12/872,779, filed Aug. 31, 2010.

Williamson, "Systems and Methods for Interpolating Alternative Input Sets Based on User-weighted Variables", U.S. Appl. No. 12/951,881, filed Nov. 22, 2010.

Williamson, "Systems and Methods for Tracking Differential Changes in Conformal Data Input Sets", U.S. Appl. No. 12/951,937, filed Nov. 22, 2010.

Williamson, "Systems and Methods for Training a Self-Learning Network Using Interpolated Input Sets Based on a Target Output", U.S. Appl. No. 12/872,935, filed Aug. 31, 2010.

Williamson, "Systems and Methods for Embedding Interpolated Data Object in Application Data File", U.S. Appl. No. 12/955,717, filed Nov. 29, 2010.

Williamson, "Systems and Methods for Generating Interpolated Input Data Sets Using Reduced Input Source Objects", U.S. Appl. No. 12/955,768, filed Nov. 29, 2010.

Williamson, "Systems and Methods for Filtering Interpolated Input Data Based on User-Supplied or Other Approximation Constraints", U.S. Appl. No. 12/955,790, filed Nov. 29, 2010.

Williamson, "Systems and Methods for Validating Interpolation Results Using Monte Carlo Simulations on Interpolated Data Inputs", U.S. Appl. No. 13/037,344, filed Nov. 29, 2010.

Williamson, "Systems and Methods for Generating Portable Interpolated Data Using Object Based Encodig of Interpolated Results", U.S. Appl. No. 13/037,322, filed Feb. 28, 2011.

Williamson, "Systems and Methods for Generating Interpolation Data Template to Normalize Analytic Runs", U.S. Appl. No. 13/037,332, filed Feb. 28, 2011.

Williamson, "System and Methods for Generating Interpolation Data Sets Converging to Optimized Results Using Iterative Overlapping Inputs", U.S. Appl. No. 13/037,341, filed Feb. 28, 2011.

ASPFAQ.com, "What are the valid styles for converting datetime to string?", (2006) http://database.aspfaq.com/database/what-are-the-valid-styles-for-converting-datetime-to-string.html.

Answering Joing Queries from Multiple Aggregate OLAP Databases, Pourabbas et al, LNCS 2737, pp. 24-34, 2003.

* cited by examiner

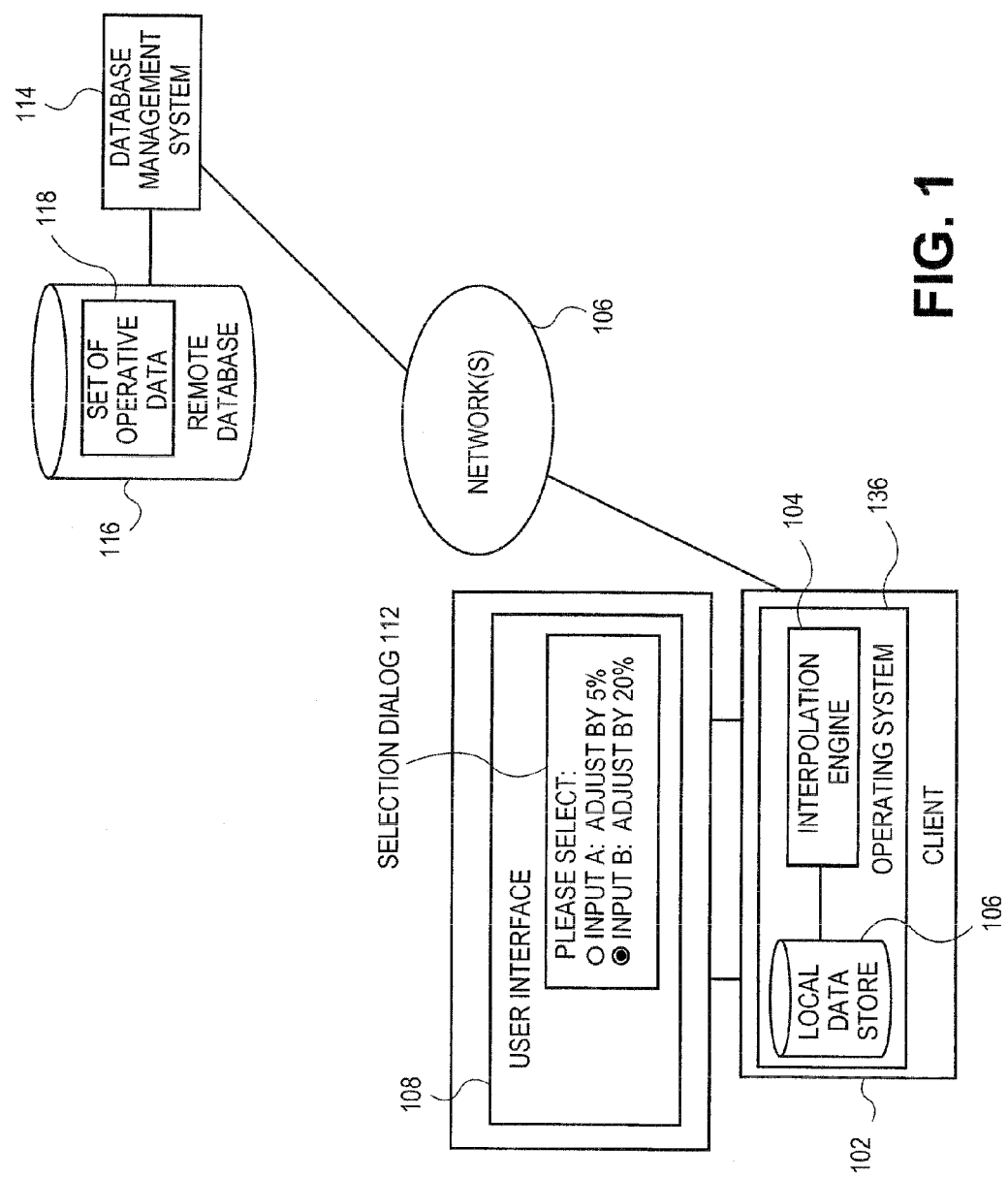

| YEAR: 2005 | REVENUE (1000s) | EXPENSES | PROFIT | ... |
|---|---|---|---|---|
| DEPT. 1 | 167 | 170 | -3 | |
| DEPT. 2 | 98 | 90 | 8 | |
| ... | | | | |
| DEPT. X | 210 | 200 | 10 | |

⎱ 122

| YEAR: 2006 | REVENUE (1000s) | EXPENSES | PROFIT | ... |
|---|---|---|---|---|
| DEPT. 1 | 174 | 160 | 14 | |
| DEPT. 2 | 104 | 103 | 1 | |
| ... | | | | |
| DEPT. X | 230 | 240 | -10 | |

⎱ 122

⋮

| YEAR: 20XX | REVENUE (1000s) | EXPENSES | PROFIT | ... |
|---|---|---|---|---|
| DEPT. 1 | 180 | 180 | 0 | |
| DEPT. 2 | 120 | 115 | 5 | |
| ... | | | | |
| DEPT. X | 240 | 230 | 10 | |

SYSTEMS AND METHODS FOR BINDING MULTIPLE INTERPOLATED DATA OBJECTS

FIELD

The invention relates generally to systems and methods for binding multiple interpolated data objects, and more particularly, to platforms and techniques for generating bindings between multiple interpolation data objects to create larger-scale or larger-dimension combined objects for further interpolation operations and use.

BACKGROUND

In the fields of computational modeling and high performance computing, modeling platforms are known which contain a modeling engine to receive a variety of modeling inputs, and then generate a precise modeled output based on those inputs. In conventional modeling platforms, the set of inputs are precisely known, and the function applied to the modeling inputs is precisely known, but the ultimate results produced by the modeling engine are not known until the input data is supplied and the modeling engine is run. For example, in an econometric modeling platform, inputs for a particular industry like housing can be fed into a modeling engine. Those inputs can include, for instance, prevailing finance rates, employment rates, average new-home costs, costs of building materials, rate of inflation, and other economic or other variables that can be fed into the modeling engine which is programmed or configured to accept those inputs, apply a function or other processing to those inputs, and generate an output such as projected new-home sales for a given period of time. Those results can then be used to analyze or forecast other details related to the subject industry, such as predicted sector profits or employment.

In many real-life analytic applications, however, the necessary inputs for a given subject or study may not be known, while, at the same time, a desired or target output may be known or estimated with some accuracy. For instance, the research and development (R&D) department of a given corporation may be fixed at the beginning of a year or other budget cycle, but the assignment or allocation of that available amount of funds to different research teams or product areas may not be specified by managers or others. In such a case, an analyst may have to manually estimate and "back out" distributions of budget funds to different departments to begin to work out a set of component funding amounts that will, when combined, produce the already-known overall R&D or other budget. In performing that interpolation, the analyst may or may not be in possession of some departmental component budgets which have themselves also been fixed, or may or may not be in possession of the computation function which will appropriately sum or combine all component funds to produce the overall predetermined target budget. Adjustment of one component amount by hand may cause or suggest changes in other components in a ripple effect, which the analyst will then have to examine or account for in a further iteration of the same manual estimates.

In addition, in cases, after the interpolation results have been generated and presented to a user, it may be desirable or advantageous to permit the combination of various or multiple interpolation results or objects into a combined object. It may be the case, for example, that different sets of interpolation results, including interpolated input variables or values, may be generated at different times and/or by different users, so that different versions or dimensions of possibly related data may be developed and kept within an organization or otherwise. Similarly, in cases, a user may wish to join or "glue" related or unrelated sets of interpolated input data or other interpolation results to consolidate files, economize on storage, or to make aggregate interpolated data objects available to downstream applications that may wish to access that data from a unified location, such as spreadsheet, database, or modeling programs.

In these and other scenarios, it may be desirable to provide systems and methods for binding multiple interpolated data objects, in which a user can manipulate multiple interpolation data objects, generate data linkages between selected objects, and create an interpolation object consisting of two or more previously-generated interpolation outputs or results bound or linked into one combined object, for ease of access by other applications, flexibility of further interpolation activity, and to expand the scope of data that can be interpolated and/or seamlessly updated as a single data object, among other desirable goals.

DESCRIPTION OF DRAWINGS

FIG. 1 illustrates an overall network architecture in which systems and methods for binding multiple interpolated data objects can be practiced, according to various embodiments of the present teachings;

DESCRIPTION

Figure 2A:
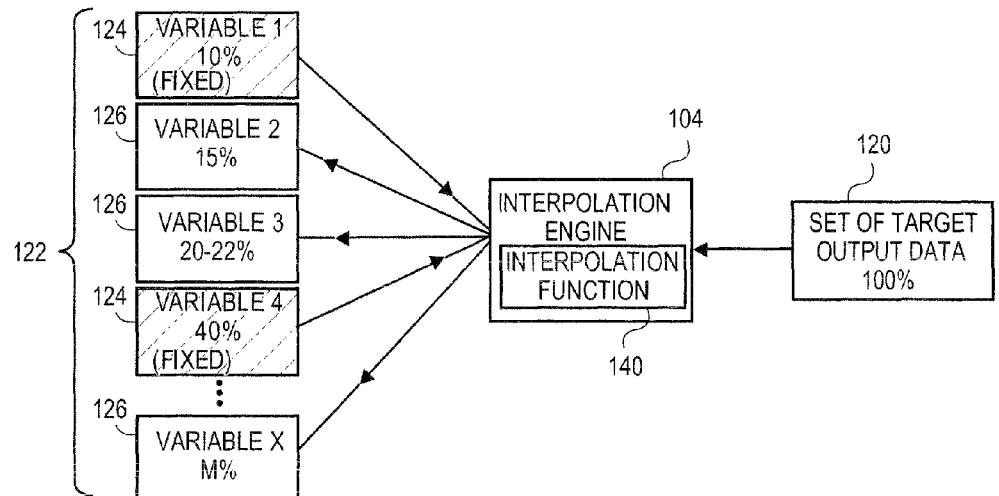
FIGS. 2A-2C illustrate various exemplary sets of input data, and series of sets of input data, that can be used in or produced by systems and methods for binding multiple interpolated data objects, according to various embodiments.

Embodiments relate to systems and methods for binding multiple interpolated data objects. More particularly, embodiments relate to platforms and techniques for accessing a set of historical, operational, archival, or other operative data related to captured technical, financial, medical, or other operations, and supplying that operative data to an interpolation engine or platform. In addition, the interpolation engine can be supplied with or can access a set of target output data, for purposes of generating a set of estimated, approximated, inferred, or otherwise interpolated inputs that can be supplied to the interpolation engine to produce the target output. Thus, for instance, in an illustrative context of a climate modeling platform, a collection or set of historical input data, such as ocean temperatures, air temperatures, land temperatures, average wind speed and direction, average cloud cover, and/or other inputs or factors can be accessed or retrieved from a data store. The data store can for instance include records of those or other variables for each year of the last ten years, along with an output or result associated with those inputs, such as ocean level or polar cap area for each of those years or other series. In aspects, a partial set or subset of predetermined or fixed values for the same inputs can be supplied to the interpolation engine, such as predicted or assumed arctic temperatures, for the current year. The interpolation engine can also receive a set of target output data, such as the expected or projected ocean level or polar cap area for the current year. According to embodiments, the interpolation engine can then generate an interpolation function, and generate a set of interpolated inputs, such as air temperature, land temperature, average wind speed and direction, average cloud cover, and/or other remaining inputs whose values are unspecified, but which can be interpolated to produce values which when supplied as input to the interpolation engine can produce the set of target output data. In cases, the interpolation engine can generate different combinations of the set of interpolated input data in different generations or series, to permit an analyst or other user to manipulate the input values, to observe different ramifications of different component values for the set of interpolated inputs. The user can be presented with a selector dialog or other interface to manipulate the set of interpolated input values, and select or adjust those values and/or the interpolation function used to generate those values. The analyst or other user can thereby determine scenarios and potential inputs that will combine to realize the desired solution in the form of the set of target output data, and the values conformally producing that output can be varied or optimized. The ability to analyze and derive input sets that will produce already-known or fixed output can thereby be automated in whole or part, permitting a user to investigate a broader array of analytic scenarios more efficiently and effectively.

In embodiments as shown in FIG. 1, in accordance with embodiments of the invention, a user can operate a client 102 which is configured to host an interpolation engine 104, to perform interpolation and other analytic operations as described herein. In aspects, while embodiments are described in which interpolation engine 104 is described to operate on historical data to interpolate or fill in missing values or parameters, in embodiments, it will be understood that interpolation engine 104 can in addition or instead operate to produce extrapolated data, reflected expected future values of inputs and/or outputs. In aspects, the client 102 can be or include a personal computer such as a desktop or laptop computer, a network-enabled cellular telephone, a network-enabled media player, a personal digital assistant, and/or other machine, platform, computer, and/or device. In aspects, the client 102 can be or include a virtual machine, such as an instance of a virtual computer hosted in a cloud computing environment. In embodiments as shown, the client 102 can host or operate an operating system 136, and can host or access a local data store 106, such as a local hard disk, optical or solid state disk, and/or other storage. The client 102 can generate and present a user interface 108 to an analyst or other user of the client 102, which can be a graphical user interface hosted or presented by the operating system 136. In aspects, the interpolation engine 104 can generate a selection dialog 112 to the user via the user interface 108, to present the user with information and selections related to interpolation and other analytic operations.

In embodiments as likewise shown, the client 102 and/or interpolation engine 104 can communicate with a remote database management system 114 via one or more networks 106. The one or more networks 106 can be or include the Internet, and/or other public or private networks. The database management system 114 can host, access, and/or be associated with a remote database 116 which hosts a set of operative data 118. In aspects, the database management system 114 and/or remote database 118 can be or include remote database platforms such the commercially available Oracle™ database, an SQL (structured query language) database, an XML (extensible markup language) database, and/or other storage and data management platforms or services. In embodiments, the connection between client 102 and/or the interpolation engine 104 and the database management system 114 and associated remote database 116 can be a secure connection, such as an SSL (secure socket layer) connection, and/or other connection or channel. The interpolation engine 104 can access the set of operative data 118 via the database management system 114 and/or the remote database 116 to operate, analyze, interpolate and map the set of operative data 118 and other data sets to produce or conform to a set of target output data 120. In aspects, the predetermined or already-known set of target output data 120 can be stored in set of operative data 118, can be received as input from the user via selection dialog 112, and/or can be accessed or retrieved from other sources.

Figure 2B:
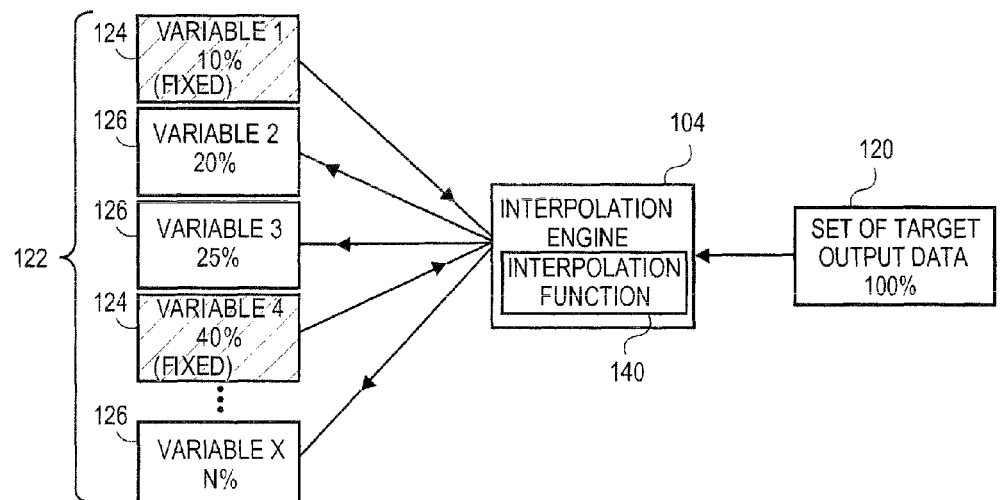
Figure 2C:
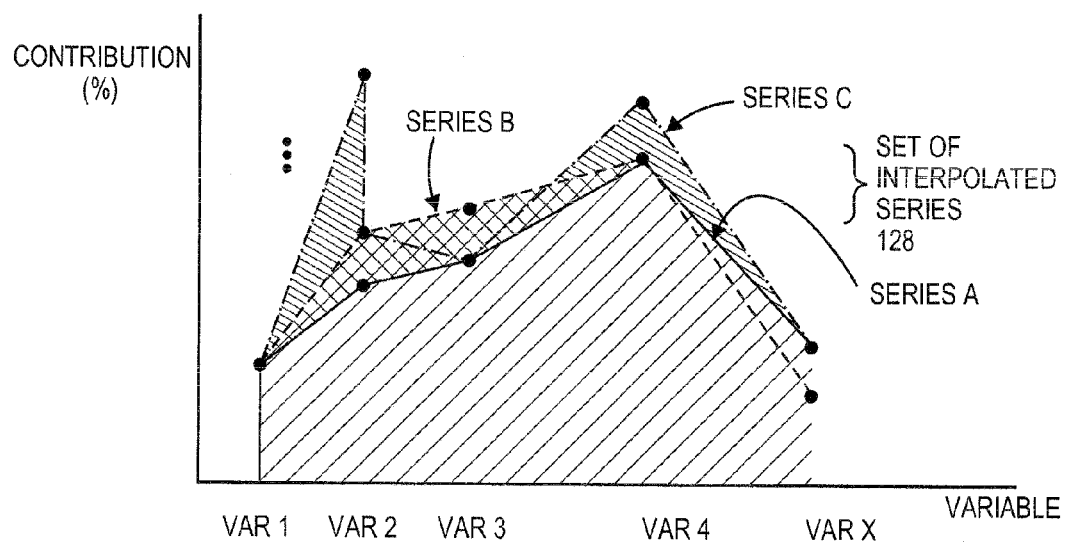

In embodiments, and as shown in FIGS. 2A-2C, the interpolation engine 104 can, in general, receive the set of target output data 120, and operate on that data to produce a conformal mapping of a set of combined input data 122 to generate an output of the desired set of target output data. As for instance shown in FIG. 2A, the set of combined input data 122 can, in cases, comprise at least two component input data sets or subsets. In aspects as shown, the set of combined input data 122 can comprise or contain a set of predetermined input data 124. The set of predetermined input data 124 can consist of data that is predetermined or already known or captured, for instance by accessing the set of operative data 118, and/or by receiving that data from the user as input via the selection dialog 112. In aspects, the set of predetermined input data 124 can include variables or other data which are already known to the user, to other parties, or has already been fixed or captured. In the case of a medical epidemiology study, for example, the set of predetermined input data 124 can include the number of vaccination doses available to treat an influenza or other infectious agent. For further example, in cases where the set of combined input data 122 represents the components of a corporate or government financial budget, the set of predetermined input data 124 can reflect the percentages (as for instance shown), for example to be allocated to different departments or agencies. It will be appreciated that other percentages, contributions, expressions, and/or scenarios or applications can be used.

In aspects, the interpolation engine 104 can access and process the set of predetermined input data 124 and the set of target output data 120, to generate a set of interpolated input data 126 which can produce the set of target output data 120 via an interpolation function 104. For instance, if the set of target output data 120 represents a total budget amount for an entity, then the set of interpolated input data 126 can reflect possible, approximate, or suggested values or percentages of that total funded amount that the interpolation engine 104 can allocate to various departments, using the interpolation function 140. Again, as noted the interpolation function 140 can be determined by interpolation engine 104 to generate the set of target output data 120, as predetermined by the user or otherwise known or fixed. In embodiments, interpolation techniques, functions, and/or other related processing as described in co-pending U.S. application Ser. No. 12/872,779, entitled "Systems and Methods for Interpolating Conformal Input Sets Based on a Target Output," filed on Aug. 31, 2010, having the same inventor as this application, assigned or under obligation of assignment to the same entity as this application, and incorporated by reference in its entirety herein, can be used in determining interpolation function 140, configuring and/or executing interpolation engine 104, and/or performing other related operations.

The following applications, scenarios, applications, or illustrative studies will illustrate the interpolation action or activity that may be performed by the interpolation engine 104, according to various embodiments. In cases, again merely for illustration of exemplary interpolation analytics, the set of operative data 118 can be or include data related to medical studies or information. Thus for instance, the set of operative data 118 can include data for a set or group of years that relate to public health issues or events, such as the population-based course of the influenza seasons over that interval. The set of operative data can include variables or inputs that were captured or tracked for the influenza infection rate in the population for each year over the given window. Those variables or inputs can be or include, for instance, the percentage of the population receiving a public vaccine by Week 10 of the flu season, e.g. 20%, the age cohorts of the patients receiving the vaccine, the strain of the influenza virus upon which the vaccine is based, e.g. H5N5, the infectivity or transmission rate for a given infected individual, e.g. 3%, the average length of infectious illness for the infected population, e.g. 10 days, and/or other variables, metrics, data or inputs related to the epidemiology of the study. In aspects, the output or result of those tracked variables can be the overall infection rate for the total population at peak or at a given week or other time point, such as 40%. Other outputs or results can be selected. Those inputs and output(s) can be recorded in the set of operative data 118 for a set or group of years, such as for each year of 2000-2009, or other periods. In aspects, data so constituted can be accessed and analyzed, to generate interpolated data for current year 2010, although the comparable current inputs are not known or yet collected. In the current year (assumed to be 2010), one or more of the set of predetermined variables 124 may be known, such as, for instance, the vaccination rate of because yearly stocks are known or can be reliably projected, e.g. at 25%. In addition, an analyst or other user may specify a set of target output data 120 that can include the overall infection rate for the population the year under study, such as 35% at peak. In cases of this illustrative type, the interpolation engine 104 can access or receive the overall infection rate (35% peak) as the set of predetermined output data 120 or a part of that data, as well as the vaccination rate (25%) as the set of predetermined input data 124 or part of that data. In aspects, the interpolation engine 104 can access the collected historical data (for years 2000-2009) to analyze that data, and generate an interpolation function 140 which operates on the recorded inputs to produce the historical outputs (overall infection rate), for those prior years, either to exact precision, approximate precision, and/or to within specified margins or tolerance. The interpolation engine 104 can then access or receive the set of target output data 120 for the current (2010) year (35% peak infection), the set of predetermined input data (25% vaccination rate), and/or other variables or data, and utilize the interpolation function 140 to generate the set of interpolated input data 126. In the described scenario, the set of interpolated input data 126 generated or produced by the interpolation engine 104 can include the remaining unknown, speculative, uncollected, or otherwise unspecified inputs, such as the percentage of the population receiving a public vaccine by Week 10 of the flu season, e.g. 25%, the age cohorts of the patients receiving the vaccine, the strain of the influenza virus upon which the vaccine is based, e.g. H1N5, the infectivity or transmission rate for a given infected individual, e.g. 4%, the average length of infectious illness for the infected population, e.g. 9 days, and/or other variables, metrics, data or inputs. In aspects, the interpolation engine 104 can generate or decompose the set of interpolated input data 126 to produce the set of target output data 120 (here 35% peak infection) to exact or arbitrary precision, and/or to within a specified margin or tolerate, such as 1%. Other inputs, outputs, applications, data, ratios and functions can be used or analyzed using the systems and techniques of the present teachings.

In embodiments, as noted the interpolation function 140 can be generated by the interpolation engine 104 by examining the same or similar variables present in the set of operative data 118, for instance, medical data as described, or the total fiscal data for a government agency or corporation for a prior year or years. In such cases, the interpolation engine 104 can generate the interpolation function 140 by assigning the same or similar categories of variables a similar value as the average of prior years or sets of values for those same variables, and then perform an analytic process of those inputs to derive set of target output data 120 as currently presented. The interpolation engine 104 can, for example, apply a random perturbation analysis to the same variables from prior years, to produce deviations in amount for each input whose value is unknown and desired to be interpolated. When combinations of the set of predetermined input data 124 and set of interpolated input data 126 are found which produce the set of target output data 120, or an output within a selected margin of set of target output data 120, the user can operate the selection dialog 112112 or otherwise respond to accept or fix those recommended or generated values.

In cases, and as for instance illustrated in FIG. 2B, the set of combined input data 122 can be generated to produce the set of target output data 120 may not be unique, as different combinations of the set of predetermined input data 124 and set of interpolated input data 126 can be discovered to produce the set of target output data 120 either exactly, or to within specified tolerance. In such cases, different versions, generations, and/or series of set of combined input data 122 can be generated that will produce the set of target output data 120 to equal or approximately equal tolerance. For example, in cases where the set of operative data 118 relates to an epidemiological study, it may be found that a limit of 20 million cases of new infection during a flu season can be produced as the set of target output data 120 by applying 40 million doses of vaccine at week 6 of the influenza season, or can be produced as a limit by applying 70 million doses of vaccine at week 12 of the same influenza season. Other variables, operative data, ratios, balances, interpolated inputs, and outputs can be used or discovered. In embodiments as noted and as shown in FIG. 2C, when the possible conformal set of interpolated inputs 126 is not unique, the interpolation engine 104 can generate a set of interpolated series 128, each series containing a set of interpolated input data 126 which is different and contains potentially different interpolated inputs from other conformal data sets in the series of interpolated input sets 128. In cases where such alternatives exist, the interpolation engine 104 can generate and present the series of interpolated input sets 128, for instance, in series-by-series graphical representations or otherwise, to select, compare, and/or manipulate the results and values of those respective data sets. In embodiments, the analyst or other user may be given a selection or opportunity to choose one set of interpolated input data 126 out of the series of interpolated input sets 128 for use in their intended application, or can, in embodiments, be presented with options to continue to analyze and interpolate the set of operative data 118, for example to generate new series in the series of interpolated input sets 128. Other processing options, stages, and outcome selections are possible.

in aspects, and as for example illustrated in FIG. 3A, the interpolation engine 104 and/or other logic can be configured to receive, apply, and process two or more sets of combined input data 122, and operate on those separately-generated sets of interpolated input data to generate a set of data bindings that can be used to create or instantiate a multiply-bound interpolation object. In aspects as shown, two or more sets of combined input data 122 can be accessed, retrieved, and/or identified, for instance by user selection, which contain interpolation data that has been produced by previous interpolation operations. In aspects, each set of combined input data 122 can include various components including, as described herein, a set of predetermined input data 124, a set of interpolated input data 126, and/or other data or variables. In aspects, one or more variables contained in each set of combined input data 122 can be related or associated with the same variables in one or more additional sets of combined input data. For instance, two or more sets of combined input data can reflect financial data for various divisions or departments of a corporation or other organization for different years, as shown. Other types of two or more sets of combined input data 122 can be used.

Figure 3B:
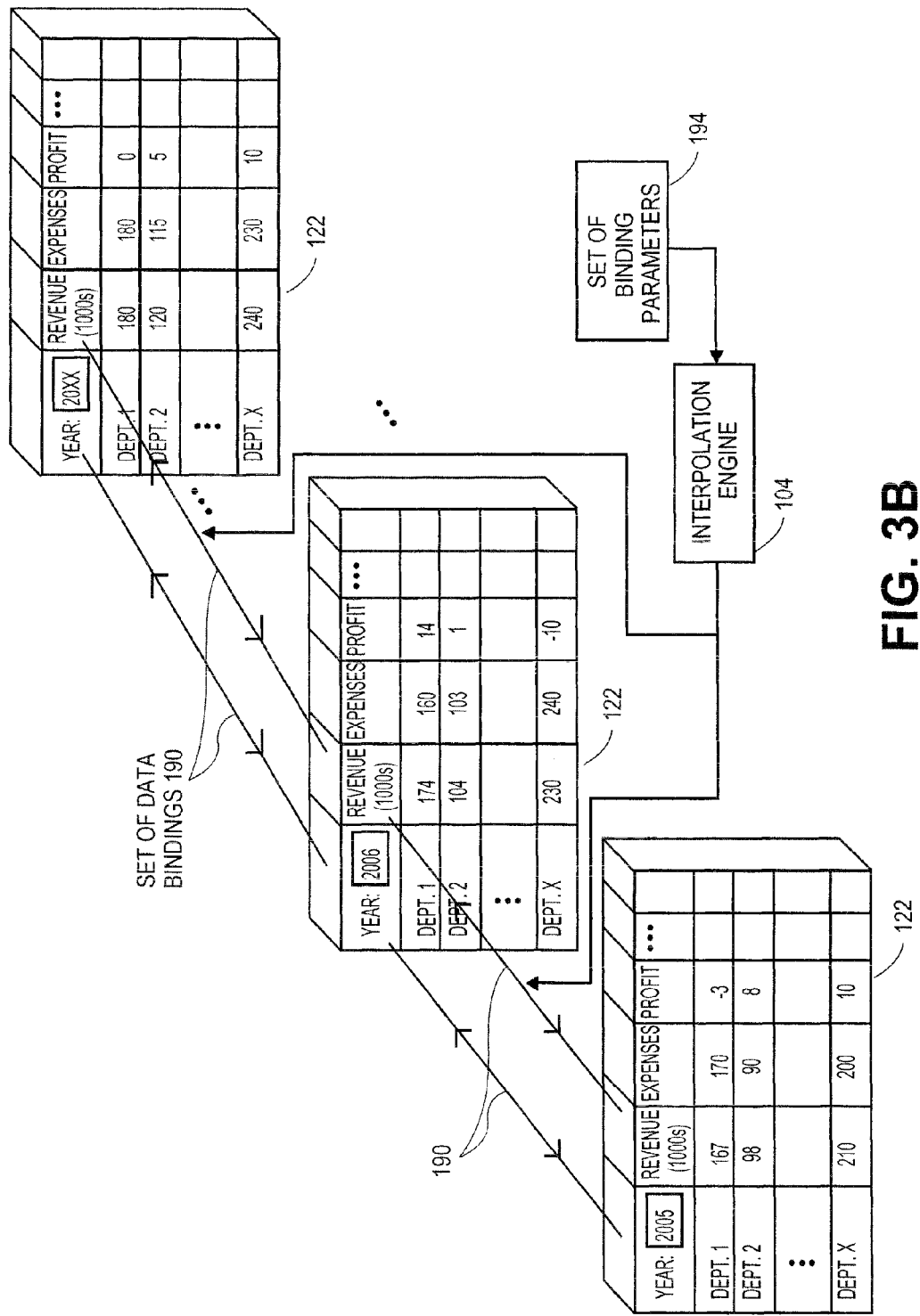
FIG. 3 illustrates an exemplary operation of application constraints as applied to a set or subset of interpolated input data, according to aspects.

As shown for instance in FIG. 3B, the interpolation engine 104 can receive 1 set of binding parameters 194 with which to configure a set of data bindings 190 between two or more sets of combined input data 122, and/or other data or variables. The set of binding parameters 194 can for instance be received through user selection or input, for instance via selection dialog 112, and/or other manual or automated sources, such as applications or services. The set of binding parameters 194 can for instance specify those variables, dimensions, arrays, parameters, values, attributes, and/or other data that will be linked, bound, and/or otherwise associated between two or more sets of combined input data 122, and/or other data. In aspects, for instance, the set of binding parameters 194 can stipulate that one column, row, dimension, layer, and/or other portion of each of the two or more sets of combined input data 122 can be linked or bound to identified other columns, rows, dimensions, layers, and/or other portions of additional sets or sets of interpolated input data, and/or other objects. In aspects as shown, financial data reflected for individual years in the two or more sets of combined input data 122 and/or other data can be bound or linked as planes or layers in a three-dimensional combined data construct. Other combinations and data constructs can be used. In aspects, the set of data bindings 190 can be or include data bindings generated via extensible markup language (XML) bindings or code, such as by instantiating a class of bindings to or by which various variables, dimensions, values, and/or other entities will be connected or defined. Other mechanisms for encoding the set of data bindings 190 can be used.

Figure 3C:
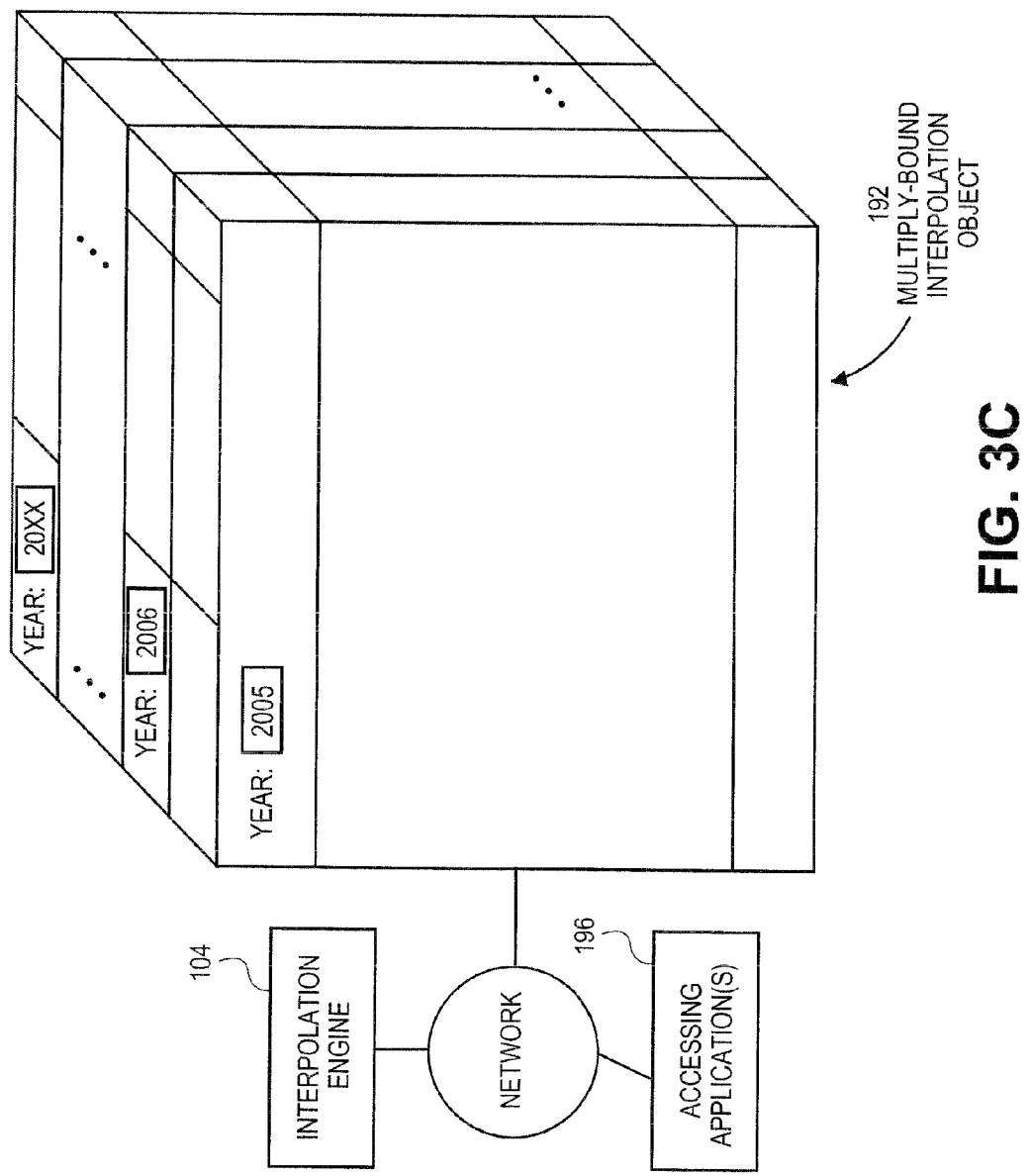

As shown in FIG. 3C, after operating on the two or more sets of combined input data 122 and/or other data, such as two or more sets of target output data 120, the interpolation engine 104 and/or other logic or service can apply the set of data bindings 190 to generate a multiply-bound interpolation object 192 in which the two or more sets of combined input data 122 and/or other data, as well as the set of data bindings 190, are embedded and combined to produce a single data object. In aspects, the multiply-bound interpolation object 192 can be stored directly as a single data object (such as an extensible markup language (XML) object) or file, or can generated a set of linked objects or files. After generating the multiply-bound interpolation object 192, the interpolation engine 104 and/or other logic or service can expose the multiply-bound interpolation object 192 to other software or services, such as a set of accessing applications 196 via one or more networks 106. The multiply-bound interpolation object 192 can be exposed to set of accessing applications 196 via memory accesses to an XML-encoded image or instantiation of the multiply-bound interpolation object 192 in client 102, and/or can be accessed via a stored copy of the multiply-bound interpolation object 192 that can be stored, for instance, in the remote database 116. The multiply-bound interpolation object 192 can also be encoded, stored, linked, accessed, and/or exposed through or from other locations, sites, data stores, or resources. By exposing the multiply-bound interpolation object 192 via one or more networks 106 and/or other channels or connections, the multiply-bound interpolation object 192 can for example be operated on by different users at different times, using different interpolation engines 104, different sets of accessing applications 196, and/or other software, interfaces, services, or tools. The diverse users can therefore access, modify, update, and re-bind the multiply-bound interpolation object 192 or portions thereof, including to bind new sets of combined input data 122 and/or other data to the multiply-bound interpolation object 192.

Figure 4:
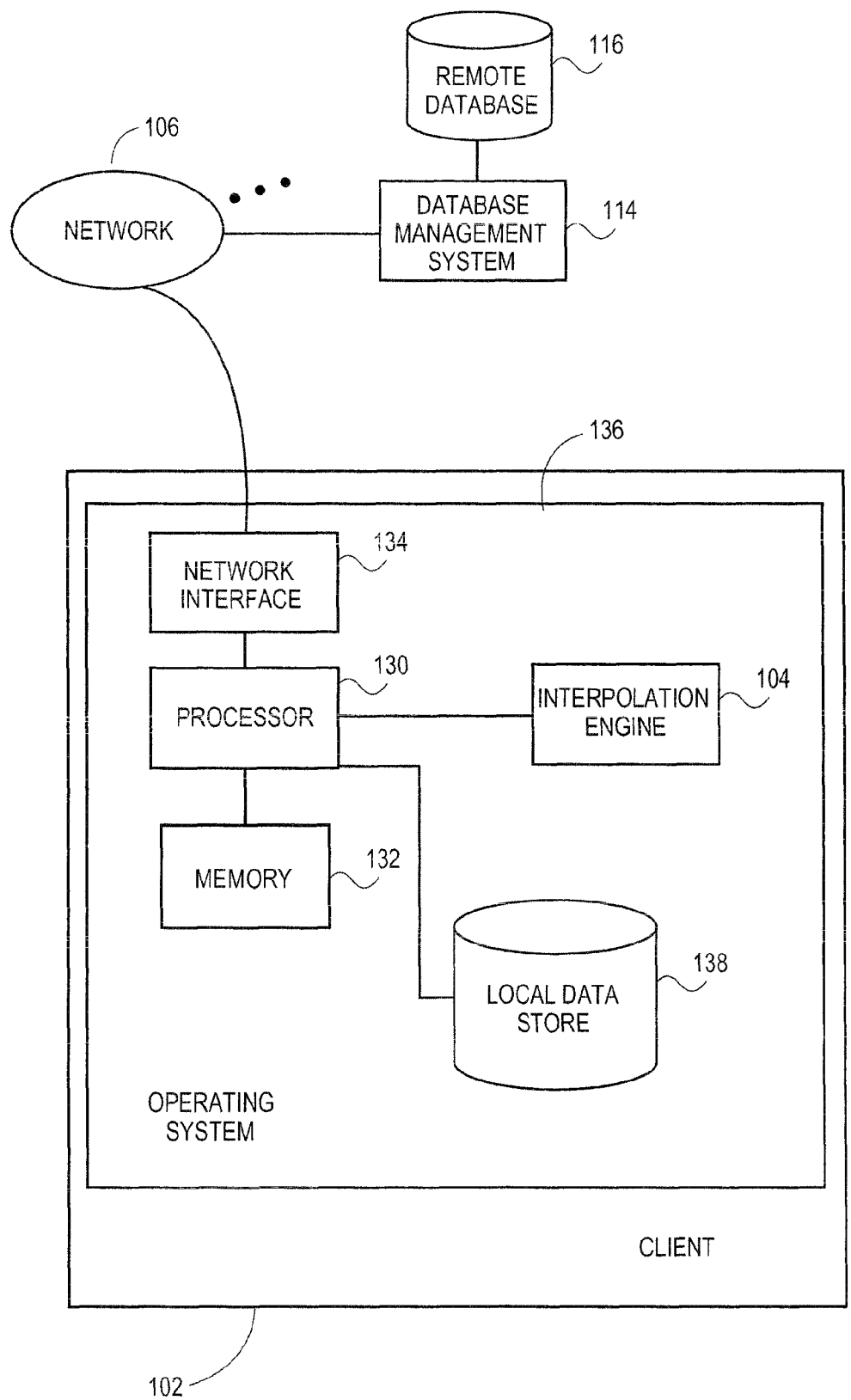
FIG. 4 illustrates an exemplary hardware configuration for client machine which can host or access systems and methods for binding multiple interpolated data objects, according to various embodiments.

FIG. 4 illustrates an exemplary diagram of hardware and other resources that can be incorporated in a client 102 that can host or be used in connection with systems and methods for interpolating conformal input sets based on a target output, according to embodiments. In aspects, the client 102 can be or include a personal computer, a network enabled cellular telephone, or other networked computer, machine, or device. In embodiments as shown, the client 102 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 can also communicate with the interpolation engine 104 and/or a local data store 138, such as a database stored on a local hard drive. Processor 130 further communicates with network interface 134, such as an Ethernet or wireless data connection, which in turn communicates with one or more networks 106, such as the Internet or other public or private networks. Processor 130 also communicates with database management system 114 and/or remote database 116, such as an Oracle™ or other database system or platform, to access set of operative data 118 and/or other data stores or information. Other configurations of client 102, associated network connections, storage, and other hardware and software resources are possible. In aspects, the database management system 114 and/or other platforms can be or include a computer system comprising the same or similar components as the client 102, or can comprise different hardware and software resources.

Figure 5:
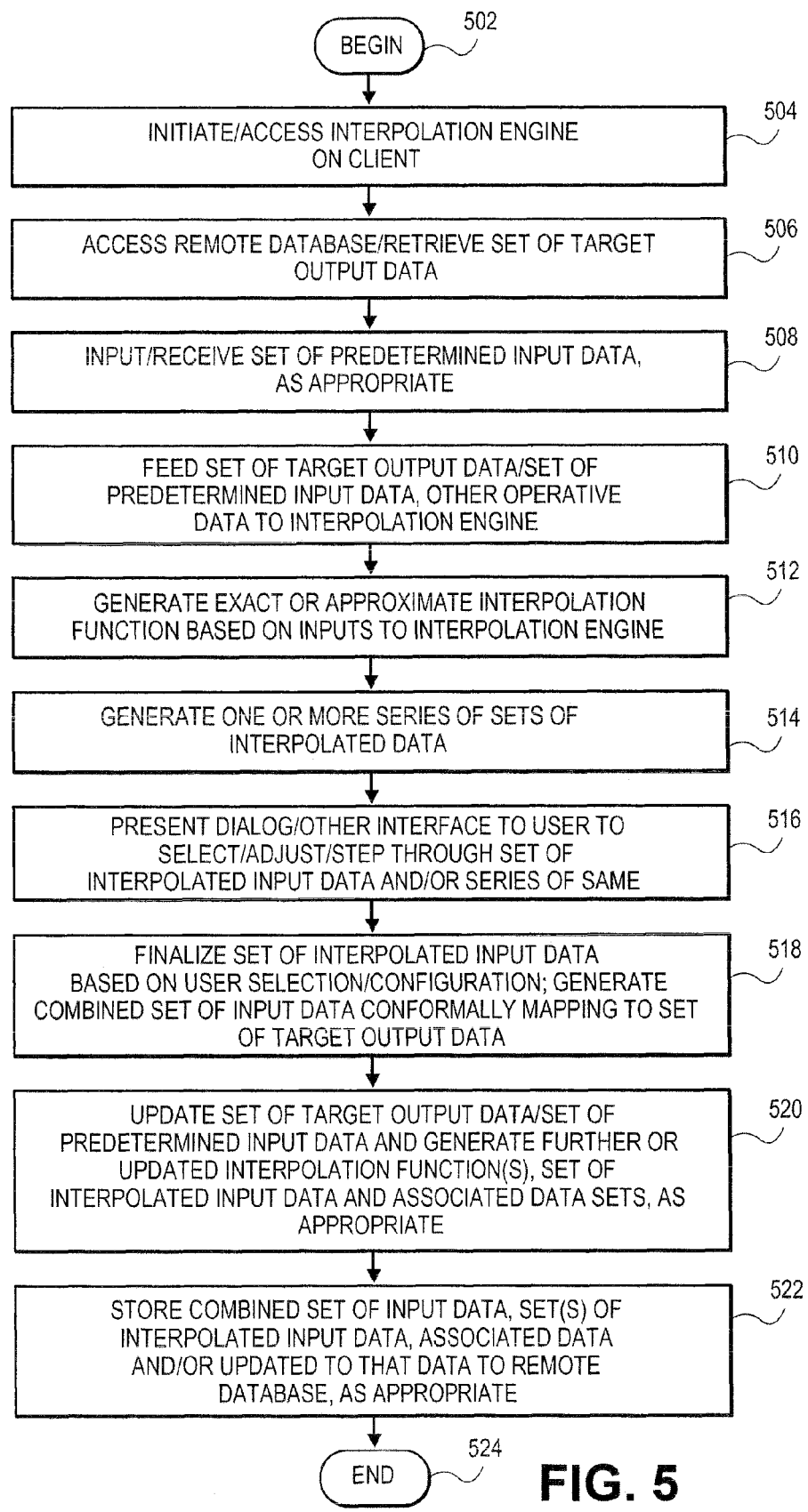
FIG. 5 illustrates a flowchart for overall interpolation, function determination, and other processing that can be used in systems and methods for binding multiple interpolated data objects, according to various embodiments.

FIG. 5 illustrates a flowchart of overall processing to generate interpolation functions, sets of interpolated data, and other reports or information, according to various embodiments of the present teachings. In 502, processing can begin. In 504, a user can initiate and/or access the interpolation engine 104 on client 102, and/or through other devices, hardware, or services. In 506, the user can access the remote database 116 via the database management system 114 and retrieve the set of target output data 120 and/or other associated data or information. In 508, the interpolation engine 104 can input or receive the set of predetermined input data 124, as appropriate. In embodiments, the set of predetermined input data 124 can be received via a selection dialog 112 from the user or operator of client 102. In embodiments, the set of predetermined input data 124 can in addition or instead be retrieved from the set of operative data 116 stored in remote database 116, and/or other local or remote storage or sources. In aspects, the set of predetermined input data 124 can be or include data that is already known or predetermined, which has a precise target value, or whose value is otherwise fixed. For instance, in cases where the set of operative data 118 relates to an undersea oil reserve in a hydrology study, the total volume of oil stored in a reservoir can be known or fixed, and supplied as part of the set of predetermined input data 124 by the user or by retrieval from a local or remote database. In 510, the set of target output data 120, the set of predetermined input data 124, and/or other data in set of operative data 118 or other associated data can be fed to interpolation engine 104.

In 512, the interpolation engine 104 can generate the interpolation function 140 as an exact or approximate function that will generate output conforming to the set of target output data 120, as an output. In aspects, the interpolation function 140 can be generated using techniques such as, for instance, perturbation analysis, curve fitting analysis, other statistical analysis, linear programming, and/or other analytic techniques. In aspects, the interpolation function 140 can be generated to produce an approximation to the set of target output data 120, or can be generated to generate an approximation to set of target output data 120 to within an arbitrary or specified tolerance. The interpolation function 140 can also, in aspects, be generated to produce set of target output data 120 with the highest degree of available accuracy. In 514, the interpolation engine 104 can generate one or more subsets of interpolated input data 126, and/or one or more set of interpolated series 128 containing individual different combinations of subsets of interpolated input data 126. In aspects, the set of interpolated input data 126 and/or series of interpolated input sets 128 can be generated by applying the set of target output data 120 to the set of predetermined input data 124 and filling in values in the set of interpolated input data 126 which produce an output which conforms to the set of target output data 120, exactly or to within a specified tolerance range. In aspects, the set of interpolated input data 126 and/or series of interpolated input sets 128 can be generated by producing sets of possible interpolated inputs which are then presented to the user via the selection dialog 112, for instance to permit the user to accept, decline, or modify the values of set of interpolated input data 126 and/or series of interpolated input sets 128.

In 516, the interpolation engine 104 can present the selection dialog 112 to the user to select, adjust, step through, and/or otherwise manipulate the set of interpolated input data 126 and/or series of interpolated input sets 128, for instance to allow the user to view the effects or changing different interpolated input values in those data sets. For example, in a case where the set of operative data 118 relates to financial budgets for a corporation, the user may be permitted to manipulate the selection dialog 112 to reduce the funded budget amount for one department, resulting in or allowing an increase in the budget amounts for a second department or to permit greater investment in IT (information technology) upgrades in a third department. In aspects, the selection dialog 112 can permit the adjustment of the set of interpolated input data 126 and/or series of interpolated input sets 128 through different interface mechanisms, such as slider tools to slide the value of different interpolated inputs through desired ranges. In 518, the user can finalize the set of interpolated input data 126, and the interpolation engine 104 can generate the resulting combined set of input data 122 which conformally maps to the set of target output data 120. In 520, the set of target output data 120, set of predetermined input data 124, and/or other information related to the set of operational data 116 and the analytic systems or phenomena being analyzed can be updated. The interpolation engine 104 and/or other logic can generate a further or updated interpolation function 140, a further or updated set of interpolated input data 126, and/or an update to other associated data sets in response to any such update to the set of target output data 120 and/or set of predetermined input data 124, as appropriate. In 522, the combined set of input data 122, the set of interpolated input data 126, the series of interpolated input sets 128, the interpolation function 140, and/or associated data or information can be stored to the set of operative data 118 in the remote database 116, and/or to other local or remote storage. In 524, as understood by persons skilled in the art, processing can repeat, return to a prior processing point, jump to a further processing point, or end.

Figure 6:
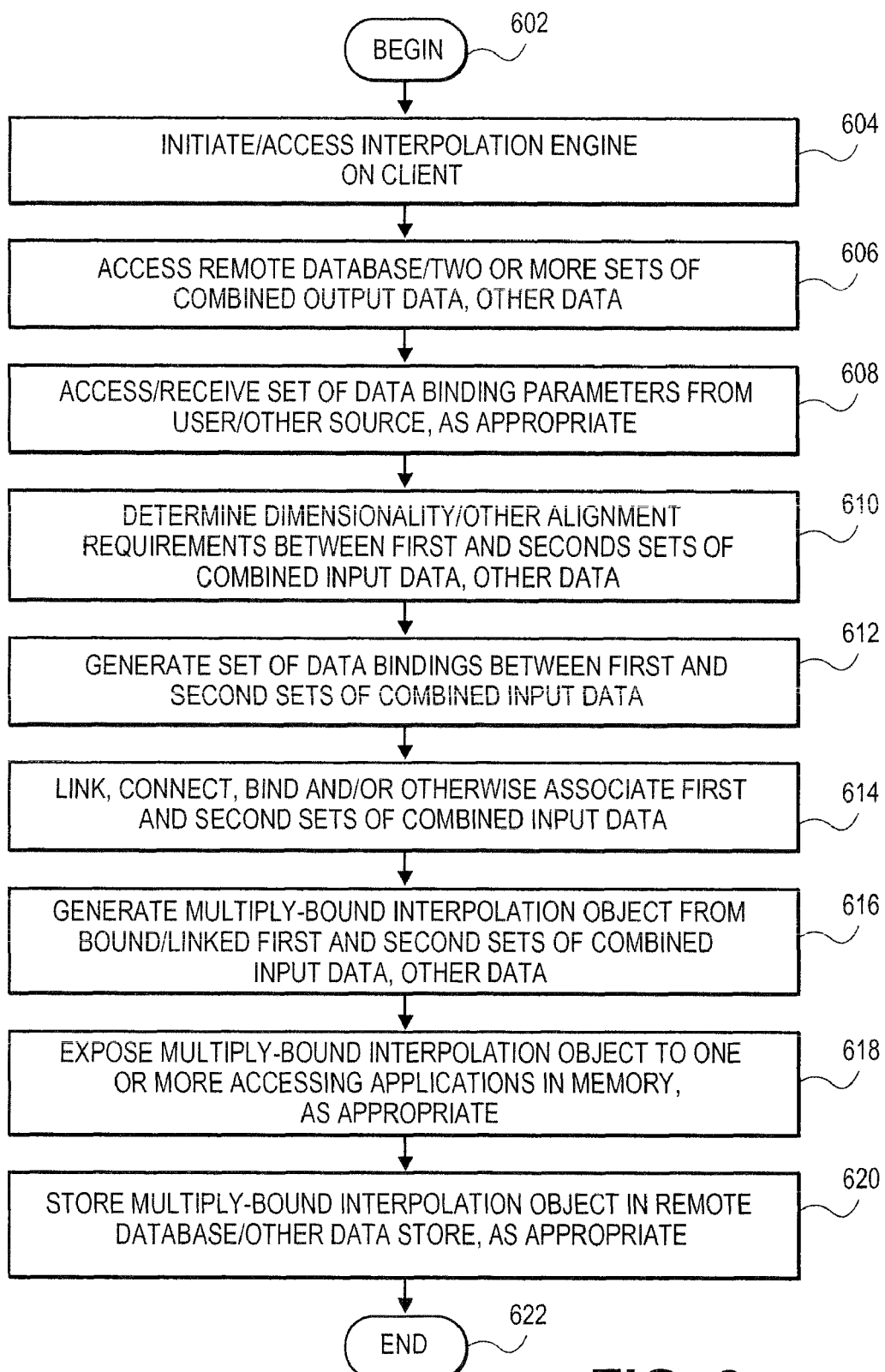
FIG. 6 illustrates a flowchart for the application of approximation constraints and/or other modifiers to interpolated input data that has been generated without modification, and other associated processing that can be used in systems and methods for binding multiple interpolated data objects, according to various embodiments.

According to aspects, the interpolation engine 104 and/or other logic or service can operate to access, manipulate, and combine two or more sets of combined input data, using set of data bindings 190 and/or other linkages, connections, and/or relationships between those data objects. FIG. 6 illustrates a flowchart of processing that can be used to perform data linkage and binding operations, to create a multiply-bound interpolation object 192 and/or other combined or aggregate interpolation data objects, according to various embodiments. In 602, processing can begin. In 604, the user can initiate and/or access the interpolation engine 104 and/or other logic or service, for instance via client 102. In 606, a user can access the remote database 116 and access or retrieve two or more sets of combined input data 122, one or more sets of target output data 120, and/or other files or data. In 608, the interpolation engine 104 can access and/or receive one or more sets of binding parameters 194 from the user and/or other source, such as an application or service, as appropriate. In aspects, the one or more sets of binding parameters 194 can indicate which objects, dimensions, variables, entries, and/or other values or attributes which are desired to be combined, aggregated, and/or associated, such as to indicate that multiple set of combined input data 122 should be combined into a three-dimensional stacked cube or other layered object. Other variables, dimensions, criteria, and/or values can be used or specified in the set of binding parameters 194.

In 610, the interpolation engine 104 and/or other logic or service can determine the dimensionality and/or other alignment or binding requirements to bind the two or more sets of combined input data 122 together, based on those objects and their attributes, the set of binding parameters 194, and/or other factors. For example, the interpolation engine 104 and/or other logic can determine that joins can be made along one axis that is shared by the two or more sets of combined input data 122, but not along other axes or dimensions. In 612, the interpolation engine 104 and/or other logic or service can generate the set of data bindings 192 between the two or more sets of combined input data 122, for instance, by inserting or embedding links, pointers, pipes, and/or other objects or information in the sets of combined input data 122 themselves, and/or by storing the links or bindings in a separate set of attributes, and/or other data store or file. In 614, the interpolation engine 104 and/or other logic or service can apply the multiply-bound interpolation object 192 to the two or more sets of combined input data 122 to bind, link, connect, and/or otherwise associate the first and second sets of combined input data 122, and/or other numbers of sets of combined input data 122.

In 616, the interpolation engine 104 and/or other logic or service can generate the multiply-bound interpolation object 192 from the bound and/or linked first and second sets of combined input data 122, and/or further or additional sets of combined input data 122. In 618, the interpolation engine 104 and/or other logic or service can expose the multiply-bound interpolation object 192 to one or more accessing applications 196 in the memory of client 102 and/or other machine, such as other server, client, and/or virtual machines. In 620, interpolation engine 104 and/or other logic or service can store the multiply-bound interpolation object 192 in the remote database 116 and/or other local or remote data store. In 622, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which the interpolation engine 104 comprises a single application or set of hosted logic in one client 102, in embodiments the interpolation and associated logic can be distributed among multiple local or remote clients or systems. In embodiments, multiple interpolation engines can be used. Similarly, while embodiments have been described in which the set of operative data 118 is accessed via one remote database management system 114 and/or a remote database 116 associated with the remote database management system 114, in embodiments, the set of operative data 118 and associated information can be stored in one or multiple other data stores or resources, including in local data store 138 of client 102. Other resources described as singular or integrated can in embodiments be plural or distributed, and resources described as multiple or distributed can in embodiments be combined. The scope of the invention is accordingly intended to be limited only by the following claims.

What is claimed:

1. A method comprising:
    obtaining first interpolated input data that, in conjunction with first predetermined input data, maps to first target output data;
    obtaining second interpolated input data that, in conjunction with second predetermined input data, maps to second target output data;
    generating a data object comprising data bindings between the first interpolated and predetermined input data and the second interpolated and predetermined input data; and
    configuring the data object for access by an accessing application.

2. The method of claim 1, wherein generating the data object comprises generating an alignment of dimensions between the first interpolated and predetermined input data and the second interpolated and predetermined input data.

3. The method of claim 1, wherein the data bindings comprises class bindings defining an object class for the data object.

4. The method of claim 1, wherein the data object comprises an extensible markup language (XML)-based object.

5. The method of claim 3, wherein the object class is accessible to the accessing application.

6. The method of claim 1, further comprising storing the data object to a data store.

7. The method of claim 1, further comprising automatically updating the data object based on an update to at least one of the first interpolated input data, the first predetermined input data, the second interpolated input data, or the second predetermined input data.

8. The method of claim 1, further comprising generating data bindings between the data object and one or more additional sets of interpolated and predetermined input data.

9. The method of claim 1, wherein the accessing application comprises at least one of a spreadsheet application, a database application, a modeling application, a statistical application, or an enterprise resource planning (ERP) application.

10. The method of claim 1, wherein the first interpolated input data comprises at least one of a set of financial data, a set of medical data, a set of demographic data, a set of engineering data, a set of network operations data, or a set of geographic data.

11. The method of claim 1, wherein the first target output data and the second target output data comprise the same data.

12. A system comprising:
    a memory to store first interpolated input data that, in conjunction with first predetermined input data, maps to first target output data and to store second interpolated input data that, in conjunction with second predetermined input data, maps to second target output data; and
    a processor coupled to the memory, the processor to:
        generate a data object comprising data bindings between the first interpolated and predetermined input data and the second interpolated and predetermined input data; and
        configure the data object for access by an accessing application.

13. The system of claim 12, wherein the processor is configured to generate the data object by generating an alignment of dimensions between the first interpolated and predetermined input data and the second interpolated and predetermined input data.

14. The system of claim 12, wherein the data bindings comprises class bindings defining an object class for the data object.

15. The system of claim 12, wherein the processor is further to automatically update the data object based on an update to at least one of the first interpolated input data, the first predetermined input data, the second interpolated input data, or the second predetermined input data.

16. The system of claim 12, wherein the processor is further configured to generate data bindings between the data object and one or more additional sets of interpolated and predetermined input data.

17. A non-transitory computer-readable medium having instructions encoded thereon which, when executed by a processor, cause the processor to perform a method comprising:
    obtaining first interpolated input data that, in conjunction with first predetermined input data, maps to first target output data;
    obtaining second interpolated input data that, in conjunction with second predetermined input data, maps to second target output data;
    generating a data object comprising data bindings between the first interpolated and predetermined input data and the second interpolated and predetermined input data; and
    configuring the data object for access by an accessing application.

18. The non-transitory computer-readable medium of claim 17, wherein generating the data object comprises generating an alignment of dimensions between the first interpolated and predetermined input data and the second interpolated and predetermined input data.

19. The non-transitory computer-readable medium of claim 17, wherein the method further comprises automatically updating the data object based on an update to at least one of the first interpolated input data, the first predetermined input data, the second interpolated input data, or the second predetermined input data.

20. The non-transitory computer-readable medium of claim 17, wherein the method further comprises generating data bindings between the data object and one or more additional sets of interpolated and predetermined input data.

* * * * *